United States Patent [19]

Bishop et al.

[11] Patent Number: 4,963,182
[45] Date of Patent: Oct. 16, 1990

[54] CONTINUOUS FEED SHAFT RETORT PROCESS FOR RECOVERY OF NON-FERROUS METALS FROM PROCESS DUST

[75] Inventors: Norman G. Bishop, Ruidoso, N. Mex.; N. Edward Bottinelli, Dallas, Tex.; Norman L. Kotraba, Tega Cay, S.C.

[73] Assignee: Zia Technology, Inc., Dallas, Tex.

[21] Appl. No.: 323,297

[22] Filed: Mar. 14, 1989

[51] Int. Cl.⁵ .............................................. C21B 7/02
[52] U.S. Cl. ........................................ 75/590; 75/608; 75/661; 75/669; 75/670; 75/695; 75/706
[58] Field of Search ..................... 75/25, 66, 67 R, 71, 75/81, 84, 88, 77

[56] References Cited

U.S. PATENT DOCUMENTS

| | | | |
|---|---|---|---|
| 2,457,552 | 12/1948 | Handwerk et al. | 266/150 |
| 4,260,139 | 4/1981 | Oliver et al. | 266/154 |
| 4,384,886 | 5/1983 | Stift | 75/25 |
| 4,758,268 | 7/1988 | Bishop et al. | 75/25 |

*Primary Examiner*—Melvyn J. Andrews
*Attorney, Agent, or Firm*—Ralph H. Dougherty

[57] ABSTRACT

A method and apparatus for recovering primary metals from pyrometallurgical process dust, in which a vertical shaft retort, situated in a furnace or afterburner associated with a pyrometallurgical apparatus, such as an inclined rotary reduction smelter, and preferably having a tapered cross-section with the larger end at the bottom, receives greenball pellets from a pelletizer, vaporizes volatile metal metals therein, and removes them to an associated volatile metal recovery apparatus, while reducing and recovering the major metal oxide components in the pellets in metallized form.

13 Claims, 4 Drawing Sheets

PRIOR ART

CONTINUOUS FEED SHAFT RETORT PROCESS FOR RECOVERY OF NON-FERROUS METALS FROM PROCESS DUST

BACKGROUND OF THE INVENTION

The subject invention relates to a method and apparatus for recovering environmentally hazardous metals from flue dust or fly ash which are generally considered waste byproducts of primary pyrometallurgical processes. More particularly, it is a continuous feed shaft retort process for recover of non-ferrous metals from secondarily oxidized flue dusts recovered from primary pyrometallurgical metal producing processes. The invention is particularly adaptable for use with an inclined rotary reduction smelter or other primary metallurgical process from which energy is derived to supply the present process, but which energy would otherwise be wasted. The invention is also operable by using primary energy sources. The present invention is useful for recovering all of the known "volatile metals". These include, without limitation, zinc, lead, sodium, potassium, cadmium, arsenic, mercury, and barium.

The invented apparatus will accomplish certain results with energy savings not heretofore available to vertical retort processes for recovery of non-ferrous metals. Previous vertical retort processes such as invented by E. C. Handwerk et al, in U.S. Pat. 2,457,552, were specifically designed to smelt zinc from high grade (oxide or oxidized) primary zinc ores. The object of the Handwerk et al patent was to overcome certain technical and economic problems inherent with previous horizontal and vertical retort processes. Premature condensing of zinc vapors on the cold burden as the vapors rose through the unheated extension (top) of the vertical retort resulted in an excessive recirculating load of zinc within the retort and hindered the free movement of the burden downward through the retort; thus decreasing productivity and increasing the operating costs of the process.

To overcome the "refluxing" (which is the condensing of volatile metal on the cold burden) actions of the zinc vapor and prematurely condensed liquid metal on the burden in the top of the retort, the burden had to be preheated or precoked at temperatures between 850 and 900° C. before being fed to the vertical retort. Such precoking also served to remove moisture and volatile matter from the carbon reductant prior to the burden entering the vertical retort and thereby reducing the evolution of process limiting $H_2O$, and $CH_4$ gases inside the retort. Preheating, or precoking, actions thus improved the productivity and economics of the vertical retort process.

Precoking of the burden involves the use of an independent autogenous grate coker in which a blended burden of oxidized zinc ore, bituminous coal, anthracite coal and/or coke are burned under oxygen controlled atmospheric condition to prevent the temperature in the bed of the burden from exceeding the point at which premature reduction of the zinc oxide to zinc metal and vapor occurs. By precoking the vertical retort burden material, sufficient agglomeration strength is achieved to allow the material to withstand the rigors of passing down through the shaft of the retort without undergoing excessive disintegration which would cause loss of bed permeability in the shaft and inhibit the free passage of gases through the bed.

As the autogenous coking step is a prerequisite for the burden before it enters the Handwerk et al vertical retort process, certain environmental problems are inherent. It is known that in the case of smelting electric arc furnace (EAF) flue dusts, which contain oxides of non-ferrous metals, reduction and vaporization of the metals begin to occur in the same temperature range as is employed in the autogenous coker. While the gases generated in the autogenous coker pass through an afterburning step, waste gas scrubbing has not been thought to be necessary. Thus, reoxidized fumes of non-ferrous metals can be emitted with the stack gases from the coker, creating a potential environmental hazard in the area surrounding the autogenous coker.

Further, between the autogenous coking step and the Handwerk et al vertical retort step, the hot coked material must be protected from atmospheric air to prevent uncontrolled ignition and sintering of the burden. Such uncontrolled sintering would clinker the burden and release volatilized metal fumes to the atmosphere.

In Handwerk et al Pat. No. 2,457,552, a claim is made to introduce air, or a combustion supporting gas (which implies a possible mixture of air and oxygen), into the bottom of the retort for the purpose of igniting with residue carbon in the burden to generate additional heat and "displacement" gas inside the retort. Careful control is necessary to prevent sintering or clinkering of the burden in the shaft of the retort and to avoid generating excessive amounts of diluting gases, especially process limiting carbon dioxide. By burning the residue carbon in the spent burden exiting the heated section of the retort, additional heat and products-of-combustion gas (displacement gas) is generated. The hot displacement gas transfers the heat upward into the shaft burden, thus improving the energy efficiency of the process.

The New Jersey Zinc (Handwerk) vertical retort has straight vertical sides whereas the retort of the present invention has inclined sides with a larger cross-section at the bottom than at the top. The New Jersey Zinc vertical retort requires coke briquets and processes only high grade material and takes about twenty-four hours to treat the material. The invented apparatus utilizes only pellets which need only be dried and not pre-coked processes any type of metallized oxides, particularly low grade materials, and does so in a considerably shorter time, averaging only about four hours residence time of the material within the retort

OBJECTS OF THE INVENTION

It is a principal object of this invention to provide a method and apparatus for recovering metal values from metallurgical process dusts such as EAF flue dusts.

Another object of the present invention is to provide a system for recovery of metals from flue dusts, fly ash, and other waste products of pyrometallurgical processes, which avoids the requirement for sintered or coked feed stock.

Another object of the present invention is to provide a system for recovery of metals which utilizes a stoichiometrically balanced and pelletized feed material which is cured and reduced in one continuous operation.

It is also an object of the present invention to provide a system for recovery of metals including forming greenball pellet feed materials, which have excellent thermal shock resistance and adequate physical strength for direct placement into the high temperature atmosphere of the shaft retort without suffering critical disintegration.

It is another object of this invention to provide a means for processing secondary flue dusts from metallurgical processes.

It is another object of this invention to provide a process for recovery of zinc and other volatile metals from pyrometallurgical dusts.

It is also an object of this invention to provide an energy efficient means for operating a shaft retort.

It is another object of this invention to provide a shaft retort process which requires substantially less fixed carbon in the solid burden feed than was heretofore required.

It is also an object of the present invention to provide a process for recovery of metals from waste products which process is capable of handling low as well as high metallic content (ferrous and non-ferrous) fee material.

It is also an object of the present invention to provide a system for recovery of metals from waste products which has greatly improved gas-to-solids heat transfer within the pellet feed material.

It is also an object of the present invention to provide a retort system for recovery of metals which has significant improvement in the productivity of the shaft retort, requiring less relative working volume (cubic feet capacity) per ton of material processed per unit of time.

BRIEF DESCRIPTION OF THE DRAWINGS

The foregoing and other objects will become more readily apparent by referring to the following detailed description and the appended drawings, in which.

DETAILED DESCRIPTION OF THE INVENTION

Figure 1:
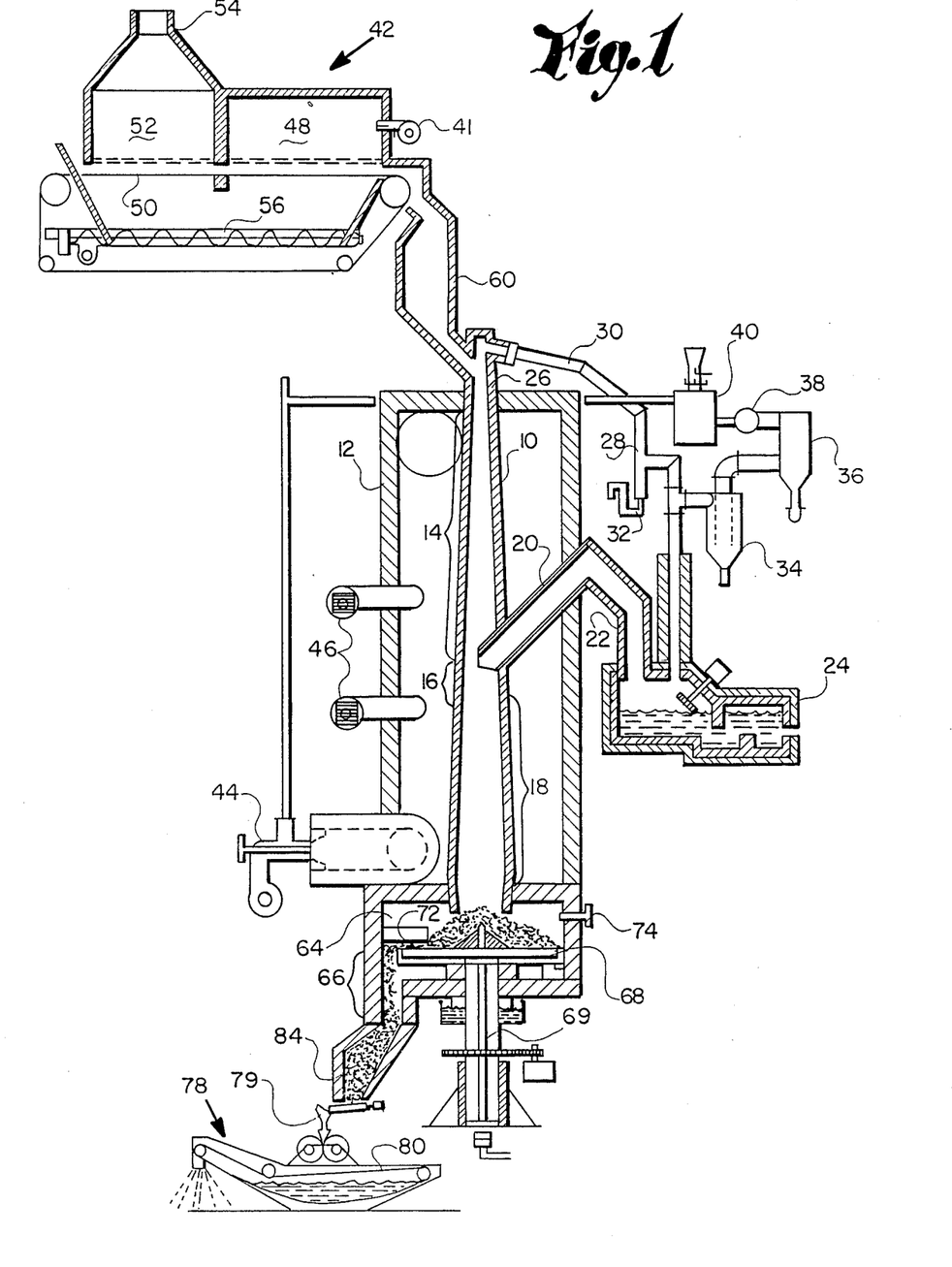
FIG. 1 is a schematic flow sheet of the apparatus of the subject invention including a shaft retort and affiliated gas handling and pellet handling equipment.

The present invention as described herein will smelt and recover environmentally hazardous metals from flue dust or fly ash which are generated as waste by-products by primary pyrometallurgical processes. Referring now to the drawings, and particularly to FIG. 1, the invented apparatus for recovering primary metals from pyrometallurgical process dust features a vertical shaft retort 10, preferably having a tapered cross-section, with the larger cross-section at the bottom end of the retort, and having charging means at its upper end for charging the vertical shaft retort with greenball pellets, means for removing or withdrawing the reduced pellets from the bottom of the retort, and causing the pellets to move continuously downward through the retort. The retort 10 is situated in a furnace 12, which is preferably an afterburner from a pyrometallurgical apparatus, such as an inclined rotary reduction smelter. The afterburner heats the exterior of the retort, which transfers heat to the interior of the retort, which is divided into three operating zones, a preheat and coking zone, a transition zone, and a reduction and vaporization (or volatilization zone.

Ahead of the retort, and communicating therewith, are a pelletizer which mixes process dust with solid carbonaceous material and a binder to form pellets, and a dryer for drying the pellets to form greenball pellets for charging to the retort.

A volatilized metal duct communicates with the interior of the retort and a splash condenser to conduct spent process gas and volatilized metals to the splash condenser.

Figure 2:
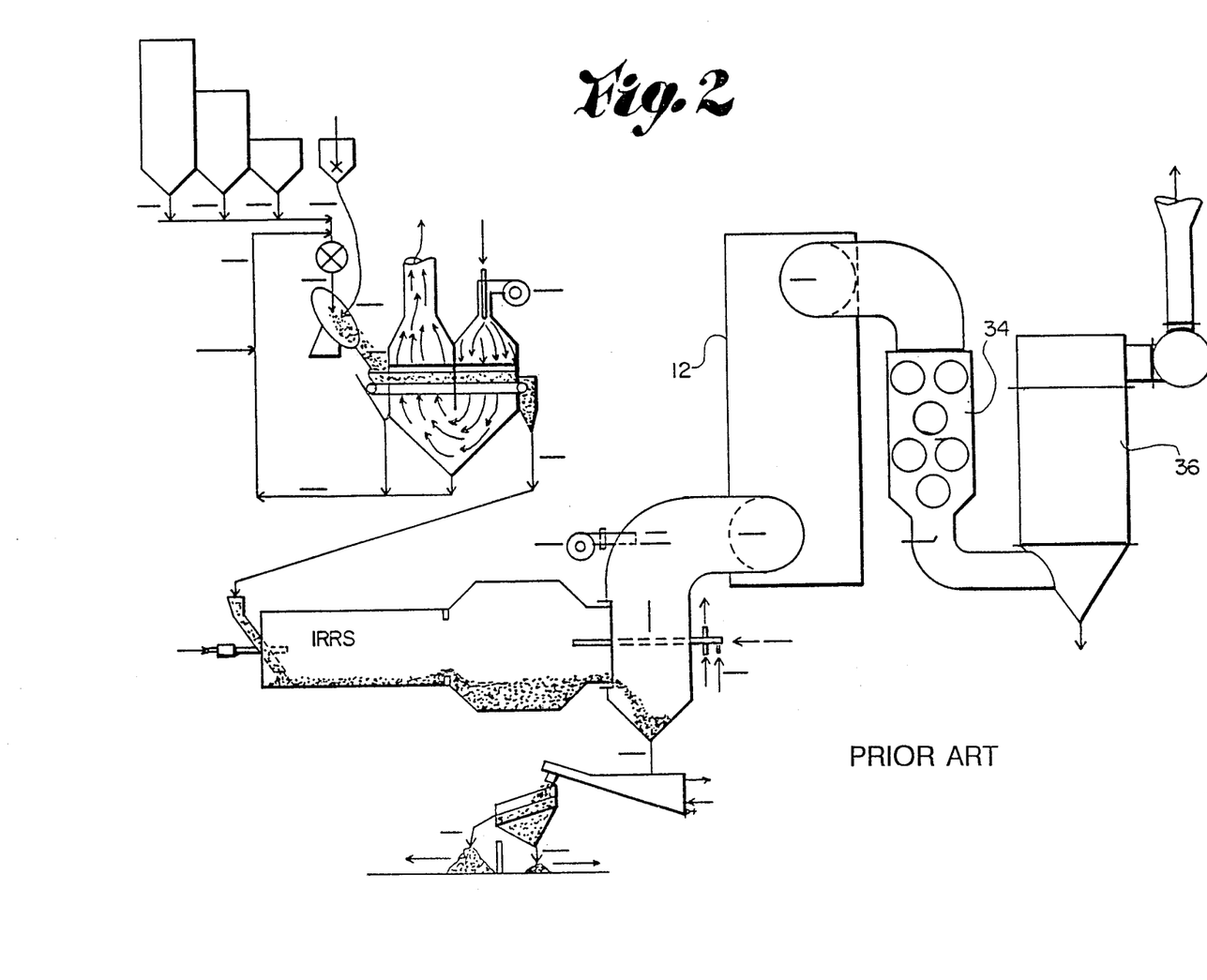
FIG. 2 is a schematic diagram of the prior art inclined rotary reduction smelter (IRRS) process.

The continuous feed shaft retort receives and utilizes waste energy from the afterburner 12 of the inclined rotary reduction smelter (IRRS) process as described in U.S. Pat. No. 4,758,268, issued July 19, 1988, (see FIG. 2), or from similar companion primary metallurgical processes capable of supplying the principal source of waste energy needed to drive the process. The invention may also stand alone by utilizing primary energy sources such as natural gas, oil, producer gas, coal, other sources of combustible materials, or combinations thereof.

The continuous feed shaft retort 10 as illustrated in FIG. 1 is a free standing shaft type structure mounted within furnace or afterburner 12, and is composed of refractory material which exhibits high physical strength, high thermal conductivity, and relatively low permeability at normal afterburner temperatures. Refractory material composed primarily of silicon carbide is preferred for such a shaft retort.

The shaft retort 10 may be either cylindrical or rectangular, and is of slightly conical or pyramidal shape, with cross sectional area of the structure being less at the top and greater at the bottom. The cross sectional area increases from top to bottom to limit or prevent the wedging effect of burden material as it flows down through the shaft retort, and to decrease the relative area through which the process metallic gases must flow, thus slightly increasing the relative velocity and/or pressure of the gases as they flow up through the vessel. This is an important aspect of the invention as the principle of barometric sealing is utilized to prevent the passage of metallic gases, carbon monoxide, hydrogen, and carbon dioxide from the reduction and vaporization zone 18 into the preheating and coking zone 14 of the continuous feed shaft retort.

The cylindrical or conical shape is preferred for structural strength; however, it is limited in diameter by the rate at which heat can be effectively transferred to the center of the cross sectional area. The rectangular or pyramidal shape may be utilized to allow better transfer of heat to the center of the cross sectional area; however, such structures do not enjoy the same structural strength as the cylindrical or conical shaped vessel. The compromise between the two structures depends on the working volume needed in the shaft retort to accommodate the desired hourly through-put rate of process material.

The location of the metallic gas/process gas extraction duct (M/PGE duct) 20 is determined by the shape of the shaft retort utilized, the process temperature, and the retention time required in the vertical retort to complete the smelting process. In general, the M/PGE duct 20 is located approximately mid-level of the heated section of the shaft retort 10. The M/PGE duct intersects the shaft retort wall at an angle of approximately 45 degrees from the horizontal and is inclined upwardly through the refractory lined wall of the afterburner 12 at the same angle. Immediately outside the afterburner wall, the M/PGE duct 20 is turned about 90 degrees to incline downwardly, then connects with a vertical duct 22, which in turn connects with a splash condenser 24. The M/PGE ducts are constructed of the same refractory material as the refractory lined shaft of the retort and are insulated only exterior to the afterburner to prevent loss of temperature of the gases as they pass into the splash condenser 24, which is of conventional commercial design.

The top 26 of the shaft retort 10 extending through the roof of the afterburner may be constructed of less expensive refractory material than silicon carbide, as its principal function is only to contain the preheated/dried greenball pellet feed for the continuous feed shaft retort process and to collect and distribute the gaseous volatile matter (primarily methane) which is driven off the greenball pellet in the preheating zone 14 of the shaft retort. The external portion of the top 26 of the shaft retort is insulated to keep the temperature of the top gas above the dew-point until the gas passes into down leg 28 of top gas collecting duct 30. In the down leg of the uninsulated top gas duct, the gas cools and moisture is precipitated, collected, and separated from the methane gas by way of a water trap 32.

Some coal oils also precipitate in the cooler down leg and become trapped with the precipitated water. The water/oil emulsion is piped to the pelletizing circuit to be consumed in the pellet making process.

The methane gas collected from the top of the shaft retort is mixed with spent process gas (from the splash condenser 24) which is primarily CO and $CO_2$ gas, with minor amounts of $H_2$, $H_2O$, and ZnO: and the combined secondary process gas contains a potential heating value of between 500 and 600 BTU per cubic foot. The secondary process gas is further scrubbed of moisture and solid particulate matter by passing through a gas cooler 34 and fabric filter (bag house) 36 before being compressed in compressor 38 and stored in a gas holder 40 for further use as a primary combustion gas in the main burner 44 of the secondary greenball pellet dryer 42. Excess secondary process gas is piped for use as a primary combustion gas in the main burner of the primary greenball pellet dryer of the IRRS process and/or as the primary combustion gas in the main burner 44, and auxiliary burners 46 of the afterburner 12, or the stand-alone furnace.

The secondary greenball pellet dryer is adapted to receive, screen, and dry a secondary greenball pellet. The secondary greenball pellet is conveyed through the high temperature section or drying zone 48 of the dryer 42 on a high alloy wire mesh belt 50. High temperature products-of-combustion gas produced by the main burner 41 of the dryer are mixed with tempering air in the dryer combustion chamber to reach a process (drying) gas temperature of 600° C. before passing downward from the combustion chamber through checkerwork refractory, which distributes the high temperature drying gas evenly over the entire bed of pellets.

The secondary greenball dryer has two drying zones, as follows:

Preheating zone 52— in which a drying gas of approximately 300° C. passes in an up-draft direction. The wet pellet bed acts to filter any entrained dust particles from the drying zone gas; thus, only steam is emitted from the dryer stack 54.

Drying zone 48— in which a drying gas of approximately 600° C. passes in a down-draft direction. After passing down through the pellet bed the drying gas is thereafter directed upwardly through the preheating zone 52.

Waste gases emitted from the secondary greenball pellet dryer are composed of $CO_2$ and $H_2$, and are devoid of particulate matter.

Figure 3:
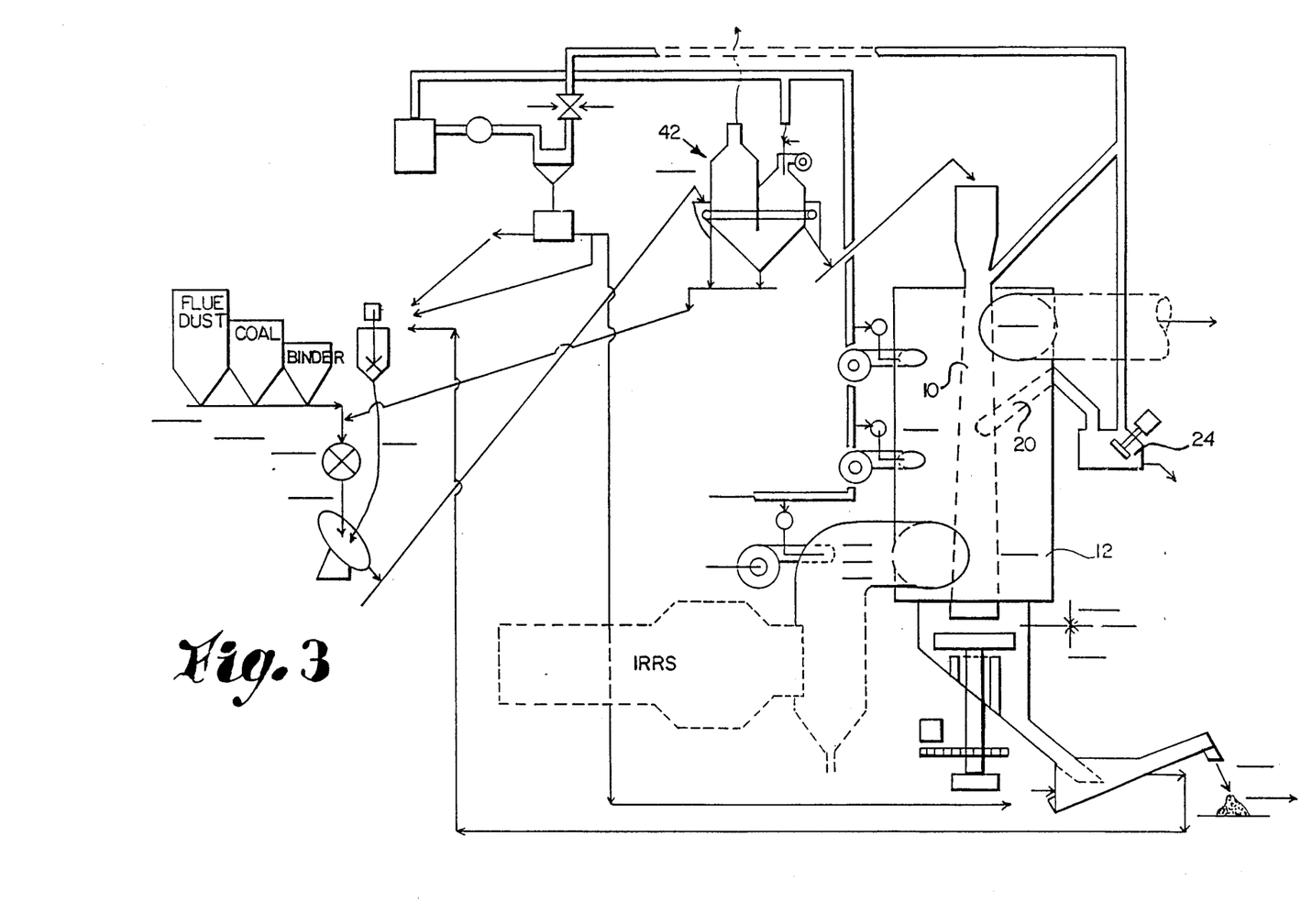
FIG. 3 is a schematic diagram of the present invention in conjunction with an inclined rotary reduction smelter.

Pellet fines which pass through the high alloy wire mesh belt 50 are collected via a screw conveyor 56 from the base of the dryer body and are recycled to the secondary pelletizing circuit, shown in FIG. 3.

Dried, and preheated (about 300° C.) secondary greenball pellets pass from the dryer 42 directly into an insulated holding bin 60 on or at the top 26 of the shaft retort 10. The bed of dry pellets in the holding bin serves adequately as a barometric seal to prevent methane gas, which is emitted from the top of the shaft retort, from passing into the dryer. Hot methane gas emitted from the pellets in the preheating and/or coking zone 14 of the shaft retort pass up through the pellet burden into the top gas collecting duct 30. The gas pressure in the top gas collecting duct 30 is lower relative to the gas pressure in the top of the continuous feed shaft retort; thus, the top gas flows into the top gas collecting duct.

The dried and preheated secondary greenball pellet entering the top of the continuous feed shaft retort is typically composed of the following components:

| TYPICAL GREENBALL PELLET ANALYSIS | |
| --- | --- |
| Analysis | Percent |
| TOTAL Fe | 3.70 |
| $Fe_2O_3$ | 5.03 |
| $SiO_2$ | 2.49 |
| $Al_2O_3$ | 1.04 |
| CaO | 2.74 |
| MgO | 0.57 |
| MnO | 0.49 |
| S | 0.45 |
| PbO | 8.02 |
| ZnO | 43.13 |
| CdO | 0.13 |
| $Na_2O$ | 2.46 |
| $K_2O$ | 1.90 |
| Fixed Carbon | 11.15 |
| Volatile Matter ($CH_4$) | 7.68 |
| Other (Ash) | Balance |

The continuous feed shaft retort is divided into four principal process zones as follows:

First, the preheating and/or coking zone 14 where the greenball pellet enters at a temperature of approximately 300° C. and is raised to approximately 900° before passing into the transition zone 16 in the region where the M/PGE duct 20 connects to the shaft retort 10. Methane gas contained in the admixed coal in the greenball pellet becomes volatilized and is eliminated from the pellet when the pellet bed reaches 600° C. The hot methane gas passes up through the pellet bed and promotes heat transfer to the upper area of the bed before the gas exits the shaft retort via the top gas collection duct 30. Coal selected for the pelletizing process must be carefully selected to exhibit non-swelling properties and may have caking, or slightly caking properties. Additionally, the coal must have a relatively high ash fusion temperature under reducing atmosphere. This is an important aspect of this invention, as the greenball pellets are cured and coked in the preheating/coking zone 14 of the continuous feed shaft retort (where pellet integrity is very important). The practice of previous inventions is to sinter or coke the feed material external to the vertical retort. The temperature in the pellet bed in the preheating/coking zone 14 is controlled by the temperature within the afterburner 12 surrounding the shaft retort. The principal source of heat inside the bed is transferred to the bed primarily by radiation from the silicon carbide refractory of the shaft retort and secondarily by conduction from pellet-to-pellet and convection from gas-to-pellet. To accomplish adequate heat transfer through the shaft retort refractory from the afterburner 12 to the pellet bed inside the shaft retort, the temperature in the afterburner in the area of the preheating/coking zone must be maintained between 1000 and 850° C. Ancillary shell burner/blowers 46 are employed tangentially at various elevations on the afterburner shell 13 to control the temperature inside the various reaction zones of the shaft retort.

Transition zone 16, in which the pellet bed temperature is raised to above 900° C. as the body of the pellet bed moves down into an expanding chamber, is defined as the region of the connection of the M/PGE duct 20 with the body of the shaft retort. The gas pressure inside the M/PGE duct is negative relative to the gas pressure in the bed of the pellets in the area of the transition zone. Thus, metallic vapor generated in the reduction/vaporization zone 18 of the shaft retort flows from the bed into the M/PGE duct and thence to the splash condenser 24 where the metallic fumes are condensed and collected as liquid metal in the hearth of the condenser.

Reduction and vaporization zone 18, in which the pellet bed is raised from 900° C. to between 1050 and 1150° C. in a strongly reducing atmosphere, is defined by the lower portion of the retort within the afterburner. Metal oxides contained in the pellets are reduced to the metallic state, and at the temperature and atmospheric conditions employed, the non-ferrous metals largely change to the vapor (gaseous) state and enter the process gas stream. Once in the gas stream, the metal vapors pass out of the shaft retort via the M/PGE duct 20 from the transition zone 16. The process gas stream includes CO and $CO_2$, which are generated as exemplified by the following equations:

$$2C + O_2 = 2CO$$

$$3Fe_2O_3 + CO\ 2Fe_3O_4 = CO_2$$

$$Fe_3O_4 + CO = 3FeO + CO_2$$

$$FeO + CO = Fe + CO_2$$

$$ZnO_{(z)} + CO = Zn(g) + CO_2$$

$$PbO_{(z)} + CO = Pb(g) + CO_2$$

$$CdO_{(z)} + CO = Cd(g) + CO_2$$

Note: in the presence of excess carbon in the pellet, and with oxygen being available only from the oxides of metals within the pellet, the ratio of CO to $CO_2$ evolving from the reduction process will be very high.

Based on the energy needed to raise the temperature of the secondary greenball pellet feed to the continuous feed shaft retort from 300° C. to the reduction temperature of 1050° C., and including the energy needed to drive the reduction process, it is calculated that approximately $7 \times 10^6$ BTU/ton is needed to drive the total process. As the secondary process gas emitted from the continuous feed shaft retort 10 contains the potential heating value of approximately $6.89 \times 10^6$ BTU/ton feed, the process is almost autogenous even without the use of the waste energy from the after-burner of the companion pyrometallurgical process.

The lowermost portion of the shaft retort is comprised of two principal zones as follows: A spent residue excavation zone 64 and a solid residue cooling or melting zone 66.

Spent residue excavation zone 64, includes a refractory insulated vibrating or rotating table 68 capable of operating either under cooling or heating conditions. The table operates in a refractory insulated chamber 70 which is sealed from the atmosphere. Spent residue exits from the shaft retort by gravity through a gap 72 between the bottom of the shaft retort and the top surface of the discharge table. The gap between the shaft retort and the discharge table allows passage of clinkers equal to minimum of one-half the diameter of the shaft retort discharge area. Spent residue is removed from the discharge table either by a stationary scraper, in the case of a rotating table, or by the reversing action and angle-of-repose of a vibrating table, or by the angle of the surface of the table relative to the angle-of-repose of the spent residue.

The spent residue excavation zone is equipped to provide the input of additional energy in the form of an oxy/fuel burner 74 which can be operated either in oxidizing or reducing mode. The oxy/fuel burner provides additional energy input into the shaft retort to increase the transfer of high temperature energy into the pellet bed residing in the reduction vaporization zone of the continuous feed shaft retort. Further, by the nature of the oxy/fuel burner, additional internal energy input is accomplished without the addition of nitrogen to the products-of-combustion. The relatively low gas volume and high energy input from the oxy-fuel burner greatly increases the daily productivity of the continuous feed shaft retort process relative to the ratio of the working volume of the shaft retort. The low gas volume emitted by the oxy-fuel burner 74, as compared to the addition of air to the discharge zone as is taught by the Handwerk et el patents, avoids the addition of the diluting effect of nitrogen in the displacement gas in the shaft retort; therefore, a relatively larger quantity of energy can be transferred to the pellet bed in the reduction or vaporization zone.

The addition of combustion gases in the discharge area of the shaft retort, whether from the addition of air to react with residue carbon contained in the spent residue or from an oxy/fuel burner, must also be limited to prevent the temperature generated in the pellet bed from exceeding the fusion temperature of material in the bed. Uncontrolled fusion in the bed would cause excessive clinkering or sintering of the bed and hinder or prevent the free flow of the burden through the shaft retort. The oxy/fuel burner can be controlled to limit the temperature of the products-of-combustion to such level as to prevent fusion of the burden by the ratio of natural gas volume used to the volume of oxygen employed in the burner. Further, by operating the oxy/fuel burner in the spent residue excavation zone in the reducing mode (natural gas rich) the excess natural gas becomes reformed in endothermic reactions to form CO and H2 reducing gases which act to improve and complete reduction of the metal oxides which remain unreduced in the pellet burden in the lower part of the shaft retort and in the spent residue excavation zone. The additional reducing value introduced by using excess natural gas via the oxy/fuel burner allows the feed material comprising the secondary greenball pellet to employ less excess carbon in the form of coal, anthracite, or coke; thus improving the overall economics of the continuous feed shaft retort process relative to previously known processes.

Another source of gaseous fuel (natural gas and/or secondary process gas) may be injected through the steel shaft 69 of the rotary table 68. One purpose for such gaseous injection is to provide cooling for the steel shaft itself while preheating the gas being injected. Such gaseous injection through the rotary discharge table also acts to cool the refractory at the point of the highest temperature burden material exiting from the center of the shaft retort. By the injection of products-of-combustion via the oxy/fuel burner and/or via the steel shaft of the rotary discharge table, the temperature of the bed of spent residue contained on the discharge table is maintained between 1050 and 1150° C. At such temperatures, the spent residue is maintained below the point of incipient fusion and well above adequate reduction temperatures.

Figure 4:
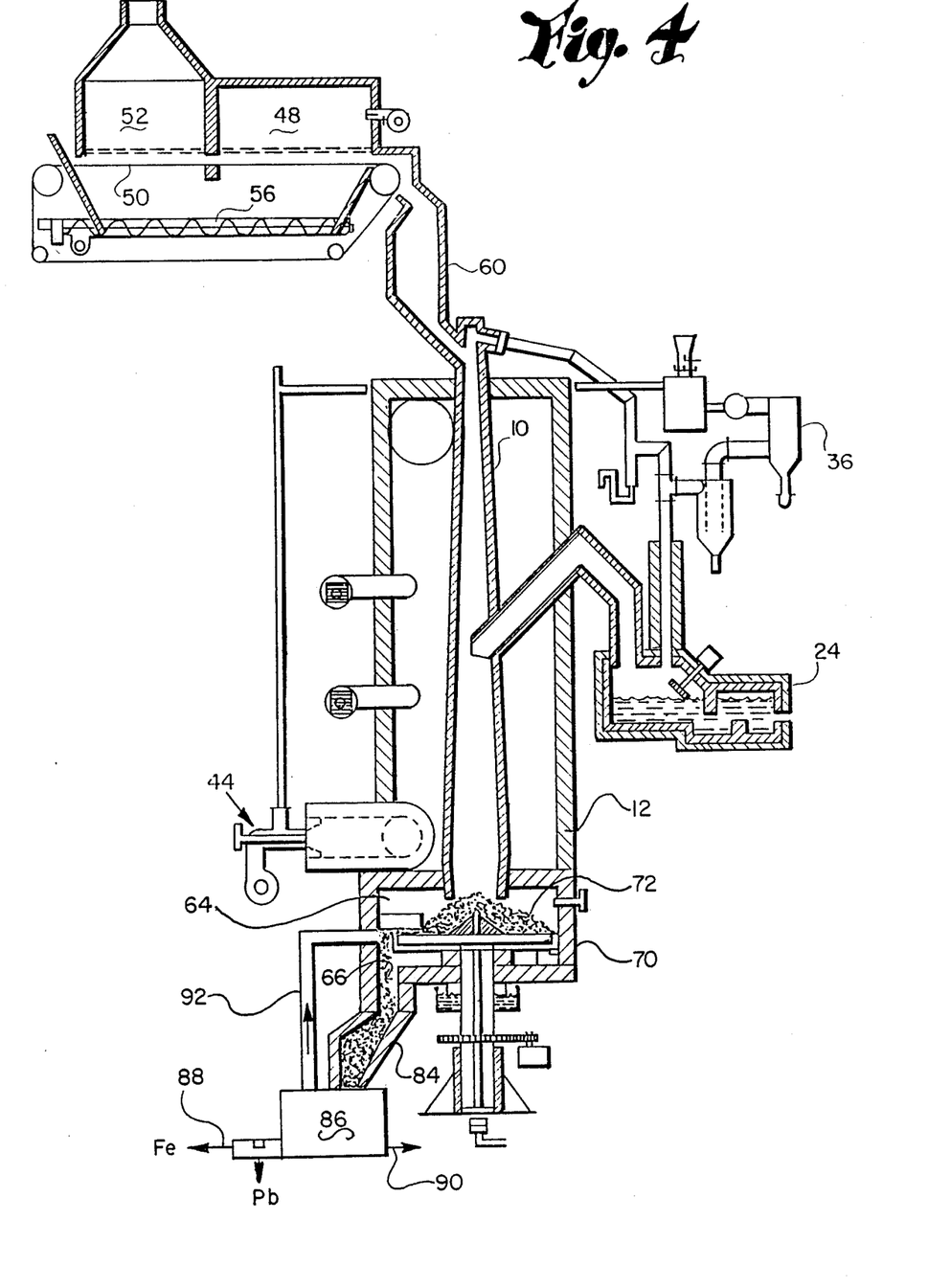
FIG. 4 is a schematic diagram of the invented apparatus according to FIG. 1 showing an alternative pellet treatment at the discharge end of the retort.

Solid residue cooling or melting zone 66 is shown in FIG. 4. Depending on the level of lead retained in the spent residue exiting the spent residue excavation zone and the end disposition of the spent residue, two methods of final dispersal are employed as follows: In water quench 78, spent residue is dropped directly from the spent residue excavation zone through a feed tube into a water quench tank. The water quench tank is sealed from the atmosphere by a water seal formed by the discharge feed tube extending into the water quench tank below the level of water contained in the tank. Cooled spent residue is extracted from the water quench tank by drag chain 80 or a screw conveyor. The recovered spent residue is recycled to the primary pelletizing circuit of the IRRS process.

Alternatively, the discharge can be as shown in FIG. 4, in which the spent residue exiting the spent residue excavation zone 64 is discharged into a refractory insulated holding bin 84, which in turn meters the material into a melting furnace 86 wherein the temperature of the material is raised to above 1450° C. and melted. In the melting furnace, additional slag forming agents and small quantities of scrap iron (not steel) may be added as needed to lower the liquidus temperature of the iron and slag bath to the lowest economical potential. As all metals remaining in the spent residue enter the melting furnace essentially free of oxides, and the atmosphere in the furnace is maintained under reducing conditions, very little, if any, reformation of metal oxides occur. Metals such as iron and lead remaining in the spent residue collect in liquid form in the hearth of the furnace. The collected liquid metals separate by gravity and are decanted periodically at 88, and slag (low in FeO) will be continuously discharged at slag notch 90. Gases formed in the melting furnace are removed through duct 92 back into the spent residue extraction zone for recycle through the continuous feed shaft retort process. The gases contain CO, $CO_2$, $H_2$, plus metallic vapors of Zn, Pb, and Cd. The melting furnace is of conventional commercial design.

The following summarizes the operation of the invented method:

The present invention employs greenball pellet as the process feed stock instead of the sintered or coked feed stock required by previous vertical retort processes. We utilize a carbon to metallic oxide balanced and pelletized feed material which is cured and reduced in one continuous operation, unlike known processes which use separate sintering or coking furnaces to indurate the feed material prior to entering the vertical retort. Separate sintering or coking steps are inherently subject to emitting hazardous heavy metal fumes to the environment surrounding the operating facility, which renders them dangerous to persons in the area.

By intimately blending carbonaceous reductants with the host secondary flue dust (or other sources of metal bearing ores) in the form of greenball pellets (in the size range of $\theta$ to ¾ inch diameter) with a commercially available binding agent, our resulting greenball pellet has excellent thermal shock resistance and has adequate physical strength for direct placement into the high temperature atmosphere of the shaft retort without suffering critical disintegration.

The greenball pellets of this invention, in addition to having the good qualities listed, above also provide excellent bed permeability, high heat transfer qualities, and superior reducibility due to significantly higher internal pellet porosity (as compared to the more dense presintered, or precoked agglomerates used by previous processes).

The invented system reprocesses secondary flue dust from sources of primary metallurgical production, and technically the process is capable of handling low as well as high metallic content (ferrous and non-ferrous) feed material.

The invented system provides significant energy conservation relative to previously known vertical retort processes and systems. Volatile matter, essentially methane which is contained in the uncoked carbonaceous reductant admixed and pelletized with host metal bearing flue dust, is volatilized in the preheating and coking zone in the upper portion of the shaft retort and exits the shaft retort via the top gas collecting duct. The relatively pure methane gas is mixed with the $CO/CO_2$ gas from the liquid metal condensing system, and the mixed gas containing between 500 and 600 BTU per cubic foot is cleaned and recycled as a fuel for the principal process burners.

The principal high temperature energy needed to drive the reduction process in the continuous feed shaft retort may be supplied in total or in part by waste energy contained in waste gases from the companion primary metallurgical process.

The greenball pellet developed for use in the continuous feed shaft retort process contains only about ten percent fixed carbon (FC), whereas previous vertical retort inventions require more than twenty percent of fixed carbon in the solid burden feed to the retort. By the practice of this invention, the excess carbon or reducing agents needed to complete the reduction processes in the shaft retort are supplied by the reformation of natural gas and/or recycled secondary process gases as described above.

This invention provides greatly improved gas-to-solids heat transfer within the pellet bed inside the reduction/vaporization zone of the shaft retort by injection of nitrogen free, low $CO_2$, and high temperature combustion gases produced by the oxy/fuel burner located in the spent residue excavation zone below the shaft retort.

The absence of nitrogen from the products-of-combustion emitted from the oxy/fuel burner allows a much higher quality reducing and heat transfer "displacement" gas to be introduced internally into the shaft retort without excessively diluting the metal vapors contained in the hot process gases which enter the liquid metal condensing system from the continuous feed shaft retort.

The improvement in heat transfer allows a significant improvement in the productivity of the shaft retort as less relative working volume (cubic feet capacity) is needed per ton of material processed per unit of time. This fact is quantified by a comparison of the relative volumes of gas and energy content which can be injected into the vertical retort of previous inventions with this invention as follows:

On an equal gas volume-to-gas volume basis, the injection of the gas volume generated as the products-of-combustion (incomplete) from the oxy/fuel burner of this invention will supply approximately one third more reducing gas and three times more BTU (heat energy) than the injection of air as practiced by previous inventions.

Because the combustion reactions mentioned above as "incomplete" are oxygen deficient, the resulting actual flame temperature will be suppressed sufficiently t prevent the material residing within the spent residue excavation zone from exceeding the temperature of incipient fusion.

Due to the significant improvement in the ability of this system to transfer heat to the center of the pellet bed inside the reduction and vaporization zone of the shaft retort, the former limit of approximately twelve to fifteen inches of internal width between heated wall surfaces can be increased to between twenty-four to thirty inches— depending on the exact temperature of the point of incipient fusion of the particular material being processed. The relative improvement in working volume per vertical foot of retort height is on the order of three to four.

In this invention, the transition zone provides an area in which the pellet bed moves into an open area where gases in the pellet bed are allowed to expand into a lower pressure area comprised of the metallic/process gas extraction duct. By maintaining the bed temperature in the transition zone above 900° C., problems associated with "refluxing" of metal vapors with prematurely condensed liquid metal and pellets within the pellet bed in prior art vertical retorts are avoided.

We claim:

1. A method for recovering primary metals from pyrometallurgical process dust comprising:
    blending said dust with solid carbonaceous material and a binder, and pelletizing the blended materials to form greenball pellets;
    charging a vertical shaft retort with said greenball pellets and causing them to move continuously downwardly through said retort, said retort having an upper preheating and coking zone, an intermediate transition zone, and a lower reduction and vaporization zone;
    providing heat to the interior of said retort by heating the exterior thereof;
    prereducing the greenball pellets in the preheating and coking zone, and releasing water vapor, gases, and volatiles from the pellets;
    removing the released water vapor, gases, and volatiles from the upper portion of the upper preheating and coking zone;
    reducing the pellets and vaporizing reduced metals therein in the lower reduction and vaporization zone;
    removing the vaporized metals from the interior of the retort at the transition zone between the upper and lower zones; and
    discharging the reduced pellets from the bottom of the retort.

2. A method according to claim 1, further comprising drying the greenball pellets prior to charging pellets into the shaft retort.

3. A method according to claim 1, wherein said blending and pelletizing forms high porosity, carbon-reductant balanced, greenball pellets.

4. A method according to claim 3, wherein said greenball pellet contains about 10 percent fixed carbon.

5. A method according to claim 1, wherein said process dust is selected from the group consisting of: fly ash, electric arc furnace flue dust, primary and secondary flue dust from metallurgical processes, and mixtures thereof.

6. A method according to claim 5, wherein said process dust contains in free or combined form at least one volatile metal.

7. A method according to claim 6, wherein said volatile metal is selected from the group consisting of: zinc, lead, sodium, potassium, cadmium, arsenic, mercury, and barium.

8. A method according to claim 7, wherein said volatile metal is zinc.

9. A method according to claim 8, wherein said volatile metal is lead.

10. A method according to claim 1, further comprising maintaining the temperature within the preheating and coking zone in the range from about 300 to about 900 C.

11. A method according to claim 1, further comprising introducing natural gas, oxygen, or a mixture thereof, into the bottom of the retort, thereby regulating retort temperature, providing carrier gas for metal vapors, improving reduction reactions, and improving thermal efficiency.

12. A method according to claim 1, further comprising maintaining the temperature within the reduction and vaporization zone in the range from about 900 to about 1100 C.

13. A method according to claim 1, further comprising utilizing removed gases from the upper portion of the preheating and coking zone as fuel gas to provide heat to the retort.

* * * * *